Dec. 16, 1930.                H. O. LOEBELL                 1,785,519
                      MANUFACTURE OF COMBUSTIBLE GAS
                   Filed June 29, 1921        3 Sheets-Sheet 1

Henry O Loebell Inventor
By His Attorney
Edmund G. Borden

Dec. 16, 1930.     H. O. LOEBELL     1,785,519
MANUFACTURE OF COMBUSTIBLE GAS
Filed June 29, 1921     3 Sheets-Sheet 2

Henry O. Loebell Inventor

By His Attorney

Edmund G. Borden

Dec. 16, 1930.   H. O. LOEBELL   1,785,519
MANUFACTURE OF COMBUSTIBLE GAS
Filed June 29, 1921   3 Sheets-Sheet 3

Inventor
Henry O. Loebell
By His Attorney
Edmund G. Borden

Patented Dec. 16, 1930

1,785,519

UNITED STATES PATENT OFFICE

HENRY O. LOEBELL, OF NEW YORK, N. Y., ASSIGNOR TO HENRY L. DOHERTY, OF NEW YORK, N. Y.

MANUFACTURE OF COMBUSTIBLE GAS

Application filed June 29, 1921. Serial No. 481,195.

This invention relates to the manufacture of combustible gas and more particularly to a method of making water gas.

The present invention has a particular relation to the intermittent method of making water gas by which a high temperature is maintained in a definite portion of the fuel bed by intermittently blasting air therethrough and then treated with steam to make gas, the fuel being continuously passed through the high temperature zone. In the patent to Henry L. Doherty, No. 1,426,159, is shown and described an intermittent method of making water gas by which the heat of combustion and the sensible heat of the blast exhaust gases are recovered in heat regenerators, and the sensible heat of the combustible gas being made is absorbed in the fuel being carbonized and preheated. In the Doherty method the fuel is passed through the generator faster than it is burned to prevent the formation of clinkers, and fuel discharged from the generator is cooled by steam introduced into the generator for gas making.

For generators having a comparatively small cross sectional area at the high temperature blast zone, the Doherty method of making gas will give very high thermal efficiencies and an excellent heat balance. It has been found, however, that when using a generator having a large cross sectional area, to provide a large gas making capacity, the blast exhaust gases contain too much potential heating value to give the proper heat balance. This is due to the fact that a passage of air through a deep fuel bed will form a high percentage of carbon monoxide. At the time the air blast first enters the fuel bed, carbon dioxide is formed and then as the carbon dioxide passes through the fuel bed it is reduced to carbon monoxide. If exhaust gases containing carbon monoxide are burned in a regenerator, the heat of combustion and the sensible heat of the exhaust gases will provide a much larger volume of heat than is necessary to preheat the air for blasting, and therefore the exhaust gases must be discharged from the regenerator hot, and deleterious temperatures may be developed in the regenerator.

One object of the present invention is to provide a method of making water gas by which high thermal efficiencies may be maintained in the gas making operation, regardless of the size of the fuel bed being treated.

In accordance with this object, one feature of the invention contemplates storing in a regenerator the sensible heat and the heat of combustion of the exhaust blast gases in such a manner that the heat may be utilized to vaporize water to form steam for use in the gas making operation.

Another feature of the invention contemplates the provision of regenerators for use in conjunction with a gas generator by which the heat of the exhaust blast gases may be carried back to the fuel in the generator by preheating the air used for blasting and by superheating the steam used for gas making.

A further feature of the invention contemplates the control of the temperatures and the position of the storage of the heat in a regenerator by which the air and steam for gas making may be heated to any desired temperature.

Operating experience has shown that no particular advantage may be gained in developing very high temperatures (that is temperatures above 2700° Fahrenheit) in the fuel bed, because the increased rate of formation of gas and the extra volume of gas which may be obtained at the very high temperatures are not large enough to offset the damage caused to the generator linings and trouble caused by the formation of clinkers. Accordingly, another object of the invention is to provide a method of making water gas by which the temperatures in the fuel bed may be controlled to give a high gas making efficiency and a large gas making capacity.

With this object in view another feature of the invention contemplates the circulation of blast air and gas making steam through the fuel column in such a manner that endothermic reactions will be maintained throughout substantially the entire length of the high temperature zone of the fuel column.

Another object of the invention is to provide a method of making combustible gas by which the quality of gas made may be widely varied and accurately controlled.

With these and other objects and features in view, the invention comprises the improved method of making combustible gas hereinafter described, and particularly defined in the claims.

The various features of the invention are illustrated in the accompanying drawings, in which:

Fig. 6 is a transverse sectional view.

The method of making gas which embodies the preferred form of the present invention is particularly adapted for making a gas consisting of a mixture of coal gas and blue water gas. To accomplish this, a mixture of coal and coke in which the coke may vary from one-fourth to one-half the amount of coal, is passed downwardly in a column through a shaft, the coal being distilled to form coal gas, and the coke admitted and also that formed in carbonizing the coal is treated with steam to make blue water gas. The coal gas and the blue water gas which are formed both pass upwardly through the fuel column and are mixed at the time they leave the fuel column. To generate gas from the fuel a high temperature zone is maintained in the mid-portion of the fuel column by blasting air through the high temperature zone. The high temperature zone is comparatively long, and by the time the blast gases have passed through it, they contain a comparatively high percentage of carbon monoxide. The exhaust blast gases from the high temperature zone are carried into regenerators where they are burned, and the sensible heat of the gases, together with their heat of combustion is absorbed in refractory storage elements to be used for preheating the air used in the blasting and for forming steam and superheating steam used in gas making. During the blasting operation the air for blasting is preheated in one regenerator and the blast products are burned in a second regenerator. During the gas making operation, water is admitted to both regenerators to form steam, the steam is superheated in the regenerators, and passed into the fuel column at the bottom of the high temperature zone. From the high temperature zone the gas formed together with any excess steam passes upwardly through the fuel column to impart its sensible heat thereto, whereby the coal of the fuel column is carbonized, the coke in the fuel column is preheated, and the gases are cooled substantially to the condensing temperature of steam at the time they leave the fuel column. During the gas making operation water is also applied to the bottom of the fuel column to quench the coke and ash and thereby form steam, and this steam passes upwardly through the fuel column to the high temperature zone, where it joins the steam being admitted through the regenerators to form gas. During both the gas making and blasting operations the fuel moves continuously downwardly through the fuel column.

Figures 3, 8, 9:
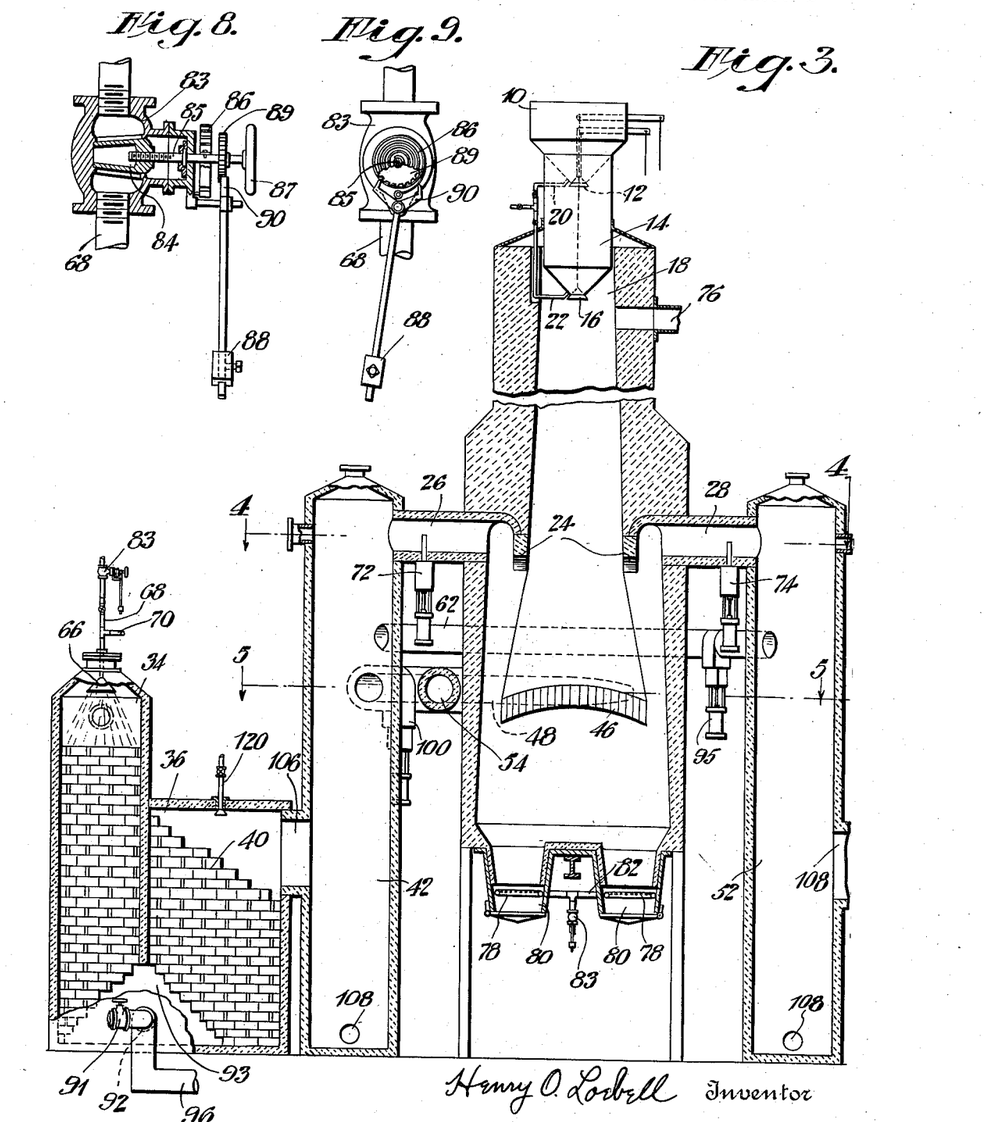
Fig. 3 is a vertical sectional view of the generator and one of the regenerators.
Fig. 8 is a vertical elevation showing details of the valves for controlling the admission of water to the regenerators and to the bottom of the gas generator.
Fig. 9 is an end view with parts broken away showing details of the same water control valves.

The preferred method of making gas may be carried out in the apparatus shown in the drawings as follows:

A mixture of coal and coke is placed in a hopper 10, Fig. 3, and passes through a valve 12 into a charging hopper 14. When the valve 12 is closed, the fuel mixture may be discharged from the hopper 14 through a valve 16 into the top of a gas generator shaft 18. The valves 12 and 16 are operated intermittently to prevent the escape of gas from the shaft 18, and any fuel or material which may be lodged on the seats of the valves 12 and 16 may be removed by means of steam admitted through pipes 20 and 22. The fuel passes downwardly through the shaft, substantially continuously and when it reaches arches 24, positioned at opposite sides of the shaft in about its mid-portion, it is subjected to an air blast, the air being admitted through necks 26 and 28, which are connected with the shaft directly behind the arches 24.

Figure 1:
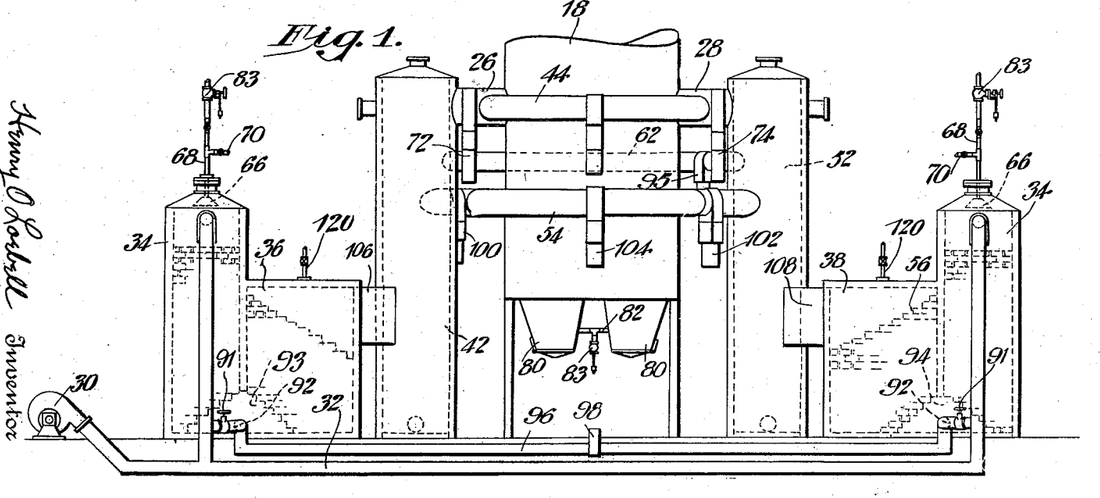
Fig. 1 is a view in the front elevation with parts broken away showing an improved gas generator, and its accompanying regenerators which embody the preferred form of the invention.
Figure 2:
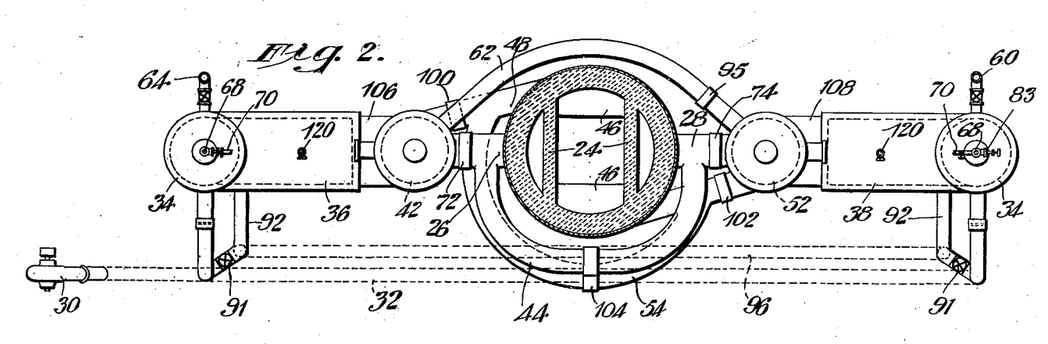
Fig. 2 is a top plan view of the generator and regenerators shown in Fig. 1.
Figure 4:
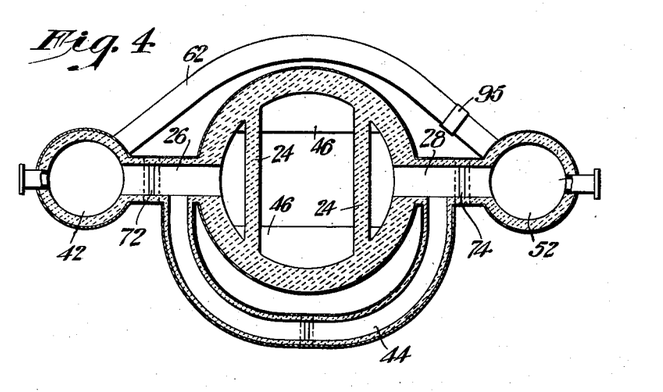
Fig. 4 is a horizontal cross sectional view of the generator taken on the line 4—4 of Fig. 3.
Figure 5:
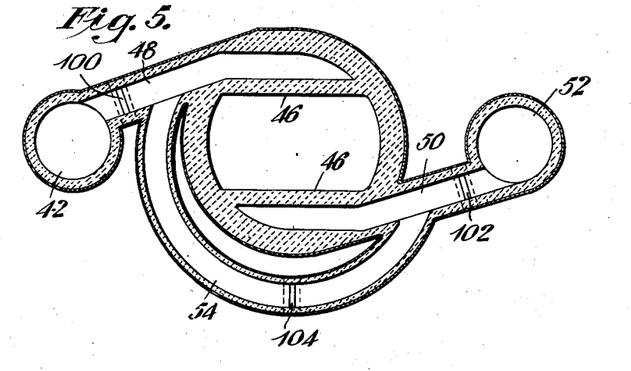
Fig. 5 is a horizontal sectional view of the generator taken on the line 5—5 of Fig. 3.

The air for blasting is circulated by means of a blower 30, Fig. 1, and passes through a conduit 32, into vaporizing elements 34 of a regenerator 36 or 38. When air is passing through the regenerator 36, Fig. 3, it enters the top of the vaporizing element 34 and immediately comes in contact with the refractory brick positioned within the vaporizing element. After the air passes through the vaporizing element it flows through a superheating element 40 into a chamber 42. From the chamber 42 the air passes through the neck 26 to enter the fuel column. The necks 26 and 28 are interconnected by a conduit 44, Figs. 1, 2 and 4, so that the air is simultaneously introduced into the fuel column behind the arches 24 at both sides of the column. The air entering the fuel column below the arches 24 passes downwardly through the fuel column and the blast products or exhaust gases leave the column behind arches 46, Figs. 2, 3, 4 and 5, which are positioned below and arranged at an angle of 90° with the arches 24. The exhaust air blast gases passing under the arches 46 flow out through necks 48 and 50, and are conducted into a chamber 52 of the regenerator 38. The gas passing into the neck 48 flows through a conduit 54, Fig. 5, which connects the neck 48 with the neck 50. After the gases pass through the chamber 52 they flow through the superheating element 56 of the regenerator 38, where a part of the heat is stored in refractory material in the superheating element, and then pass through a vaporizing element 34 of the regenerator 38. The refractory material in the superheating element and the vaporizing element of the regenerator 38 absorb substantially all of the heat of the blast gases, and the gases escape substantially cool through an outlet 60 at the top of the vaporizing element 34.

At the time the regenerator 36 is used for preheating the blast gases, the regenerator 38 is used for absorbing the heat of the waste blast gases after they have passed through the fuel bed. The high temperature blast zone is comparatively long so that the blast gases contain a comparatively high percentage of carbon monoxide at the time they leave the high temperature zone. Therefore, the blast gases are burnable and it is necessary to obtain the heat of the combustion of the gases in order to retain the potential heat therein. To burn the blast gases air is conducted from the chamber 42 through a by-pass pipe 62 which is connected between the chambers 42 and 52 immediately above the necks 48 and 50. Preheated air passes through the by-pass 62 to be mixed with the exhaust gases leaving the fuel bed. The chamber 52 gives a comparatively large space to promote the combustion of the exhaust gases, and the burning gases may rapidly pass through the chamber into the superheating element of the regenerator 38. When the regenerator 38 has acted as a heat storage element during one blast operation, during the next blasting operation it acts as the air preheating element, and the regenerator 36 acts as the heat storage element. At this time the passage of the air and blast gases through the regenerators is reversed and the cooled waste blast gases escape from the top of the vaporizing element of the regenerator 36 through an outlet 64.

After the blasting operation has continued for a sufficiently long period to develop the desired temperature in the high temperature zone located in the fuel column between the arches 24 and 46, the air is cut off and water is admitted to the top of the regenerator vaporizing elements 34 through distributing cones 66, Figs. 1 and 3. The water is supplied to the cones 66 through pipes 68, but in case the vaporizing elements of the regenerators are not heated to a sufficiently high temperature to vaporize water, steam may be admitted through pipes 70 to the cones 66. By these connections either steam or water alone, or a mixture of steam and water may be admitted to the top of the vaporizing elements 34. The water is vaporized by contact with the refractory material in the vaporizers 34 and the steam formed therein then passes through the superheating elements 40 and 56 into the chambers 42 and 52, respectively, of the regenerators 36 and 38. The steam passing through the chambers 42 and 52 enters the shaft 18 through the necks 48 and 50, and passes into the fuel column below the arches 46. By this arrangement the heat of combustion and sensible heat of the waste blast gases is conserved in supplying the heat of evaporation and the superheat of the steam used in gas making.

To confine the entrance of steam into the necks 48 and 50, valves 72 and 74, Figs. 1 and 3, are positioned in the necks 26 and 28, respectively, to cut off the flow of steam into the fuel column below the arches 24. The steam passing under the arches 46 flows upwardly through the high temperature blast zone in a path countercurrent to the path previously followed by the blast gases, and the gas formed in the high temperature zone, together with any excess steam, then passes upwardly through the fuel column and leaves the top of the shaft 18 through an outlet 76. The hot gases passing through the high temperature zone furnish sufficient heat for carbonizing the coal in the column above the high temperature zone, and by the time the gases have passed through the column they are cooled and in excellent condition to go into the scrubbing apparatus for the removal of the oils, tars, ammonia, or the like. The carbonization of the fuel in the column above the high temperature zone is carried on at comparatively low temperatures so that a large recovery of the light oils and ammonia may be effected.

During the gas making operation water is sprayed into the coke and ash at the bottom of the shaft 18 by means of rings 78, which are positioned in discharge hoppers 80 at the bottom of the shaft. The water is admitted to the rings 78 through pipes 82. The water sprayed into the column through the rings 78 acts to quench and cool the coke and ash and the steam formed in the quenching operation then passes upwardly through the unburned coke leaving the high temperature zone to cool this coke, and simultaneously form water gas. The water gas enters and passes through the high temperature zone to be mixed with the steam being admitted below the arches 46.

In the ordinary commercial processes for making water gas a constant volume of steam is admitted to the generator during the gas making operation. Under these conditions a large volume of gas is made at the beginning of the gas making operation and this gradually falls off toward the end of the gas making operation. There is a small amount of excess moisture in the gas being made at the beginning of the gas making operation, and the amount of excess moisture constantly increases toward the end of the gas making operation. A large excess of moisture in the gas is not desirable because it is the source of a large heat loss. A large amount of heat is required to evaporate the water to form the excess steam, and a large amount of cooling water is required to condense the excess steam out of the gas. According to the present invention a substantially uniform quantity of excess moisture is maintained in the gas throughout the gas making operation by admitting a variable quantity of water or steam to the fuel bed, the volume of steam being automatically decreased so thereby the volume of steam being decomposed will be substantially constant throughout the gas making operation. To accomplish this, automatic regulating valves 83 are positioned in the water pipe 68 leading to the regenerators, and in the water pipes 82 leading to the distributing rings 78 at the bottom of the gas generator shaft. The details of the regulating valve 83 are shown more particularly in Figs. 8 and 9. This valve consists of a housing having a tapered plug 84 therein for controlling the flow of water through the valve. A stem 85 is secured to the plug and is arranged to be rotated by means of a torsion spring 86, which is connected between the valve housing and the stem. At the beginning of the gas making operation the valve plug 84 is open to admit the maximum flow of water through the valve by means of a handle 87, and in opening the valve the spring 86 is wound up.

To permit the spring to rotate the plug in closing the valve, an escapement mechanism is provided, which is operated by means of a pendulum 88, to permit the closing of the valve in any desired time period. The escapement consists of a ratchet wheel 89 secured to the valve stem 85, and a pair of pawls 90, secured to the upper end of the pendulum 88. By adjusting the pendulum weight the time period for the rotation of the valve plug 84 may be varied. With this construction a maximum flow of water will take place at the time the valve is opened, the pendulum will be started, and the valve gradually rotated toward a closed position. Accordingly, the amount of water admitted per unit of time is gradually decreased, so that the amount of steam formed from the water in the regenerators is gradually decreased, and therefore the amount of steam entering the fuel bed is decreased. As the volume of steam decreases the velocity of the flow of steam decreases, and therefore the time contact between the steam and the carbon in the fuel bed is correspondingly increased. This will provide for the generation of a gradually decreasing quantity of gas of a substantially uniform quality and moisture content throughout the gas making operation. By arranging a series of gas generators each of which make a gradually decreasing volume of gas throughout the gas making period upon the supply line, the gas making period of the various regenerators may be properly timed so that a substantially uniform volume of gas can be delivered to a supply line without the use of a gas holder. It is apparent that if the mechanism of the valves 83 is set to cause their operation to be reversed, the amount of water admitted to the regenerators or to the bottom of the gas generator would be gradually increased during the gas making period, and a substantially uniform volume of gas would be generated throughout the period.

The character of the gas which may be made in the generator can be accurately controlled and widely varied by increasing or decreasing the amount of steam used during the gas making operation, and by varying the temperature of the fuel column. The comparatively great length of the high temperature zone in the fuel column provides a comparatively long time contact for the steam and the carbon in the fuel column, so that the steam may be circulated very rapidly through the high temperature zone, and still provide sufficient time for the completion of the reaction in forming water gas. This arrangement permits the character of the gas to be accurately controlled, and provides a large gas making capacity for the generators.

The fuel being treated for making gas is preferably passed through the shaft 18 at such a rate that unburned fuel will leave the shaft. By this means the carbon content of the fuel column may be maintained sufficiently high to prevent the formation of clinker during the blasting operation, and thus permit a continuous gas making operation. The carbonized fuel in the column as it approaches the arches 24 has a very high carbon content, and it has been shown by experience that if the carbon content is between 85 and 90 per cent of the fuel, the direct application of the air to the fuel column will not form clinker. When the air enters the fuel column comparatively high temperatures are formed by the burning of the air and the carbon to form carbon dioxide. The exothermic reaction between carbon and air to form carbon dioxide exists however for only a comparatively short distance from the surface of the fuel column at which the air enters, and thereafter during the passage of the blast gases downwardly through the high temperature zone the reactions are endothermic, whereby the carbon dioxide is reduced to carbon monoxide. Therefore, as the carbon content of the fuel becomes lower and lower the reactions are endothermic and the temperatures of the fuel bed are lower. By this means the formation of clinkers is prevented. Further, during the gas making operation the reactions between the steam and the fuel to form hydrogen and carbon monoxide are endothermic reactions, and therefore there is no tendency for the formation of clinkers during the gas making operation. The reactions between the carbonized fuel and the steam formed at the bottom of the fuel column are endothermic, which reactions tend to cool the fuel column and remove carbon therefrom. It will be seen therefore that during the gas making and part of the air blasting operations the heat reactions taking place in the fuel column are endothermic, which tend to cool the fuel column while at the same time removing the carbon therefrom. By these reactions the carbon content of the carbonized fuel may be reduced to a comparatively low percentage by the time it is discharged from the bottom of the column. Furthermore, the reactions may be accurately controlled, whereby the carbonized fuel may be discharged from the bottom of the shaft with substantially any desired carbon content.

The gas making capacity of the generator shown in the drawings depends directly upon the quantity of air which may be forced through the high temperature zone to develop the required temperatures for gas making. By preheating the air in the regenerators the fuel column may be heated more rapidly but it has been found that temperatures of the fuel column much in excess of 2700° Fahrenheit do not produce the best results for commercial operation. Accordingly, the blast gases are passed through the regenerators at such a rate that they will have a predetermined degree of superheat, in order to develop the proper temperatures in the fuel column. Preferably the air is admitted to a regenerator through the top of the vaporizing element, and passes through the vaporizing element, superheating element and combustion chamber in passing to the fuel column. If the regenerator superheating elements will provide a sufficient volume of heat to properly preheat the air, the air from the conduit 32 may be passed through valves 91 to inlets 92 leading into combustion chambers 93 and 94, formed in the regenerators 36 and 38 respectively, between the vaporizing elements and the superheating elements. By this means the air will pass only through the superheating elements and the combustion chambers in passing into the fuel column. It has been found that where the hot gases containing a substantial percentage of the carbon monoxide are introduced into a regenerator and directly into contact with a high temperature refractory material, there is a tendency to produce surface combustion in contact with the refractory. This surface combustion tends to develop such high temperatures that the regenerator refractories are often fused. The production of localized high temperatures in the present regenerators is avoided by providing comparatively large combustion chambers at the point where air is mixed with blast gases in the regenerator, as, for example, in the combustion chambers 42, 52, 93 and 94 of the regenerators. In some cases the blast gases which are burned in the combustion chambers 42 and 52 of the regenerators tend to develop very high temperatures in the chambers and in the adjoining superheating elements and the refractory material in the vaporizing elements is not heated to sufficiently high temperature for efficient operation. To overcome this difficulty the passage of air through the by-pass connection 62 from one regenerator to the other may be throttled or entirely cut off by means of a valve 95. At the same time preheated air may be led from one regenerator to the other through a conduit 96, Fig. 1, connected between the regenerator combustion chambers 93 and 94, to burn the blast gases as they pass from the superheating elements into the refractory of the vaporizing elements of the regenerator. The conduit 96 is provided with a valve 98 by which the flow of secondary air to the combustion chambers 90 and 92 may be accurately controlled.

As described above, it is preferred to admit steam through both regenerators simultaneously during the gas making operation, in order that the steam may be superheated as much as possible and thus conserve the heat of the fuel column in the formation of gas. In carrying on the operation, therefore, the steam will be given the preference to obtain the highest degree of superheat possible, and the air will be used to absorb the residual heat not taken up in forming steam and superheating the steam. The various connections by which the temperature of the regenerators may be controlled permit an accurate preheating of the air and steam and provide a very high thermal efficiency in view of the fact that practically all of the heat carried away from the fuel column by the blast gases is returned when preheating the air and superheating the steam. If during the blasting operation the temperature of a regenerator is so reduced that it will not be effective in superheating steam, one preheated regenerator may be used alone for superheating the steam for the gas making operation. To this end valves 100 and 102 are provided respectively in the necks 48 and 50, and a valve 104 is provided in the conduit 54, Figs. 1, 3, and 5.

With the construction illustrated in the drawings and described above it will be obvious that in place of blasting through the high temperature zone longitudinally of the fuel column, the blast may be directed transversally of the fuel column, the air entering under one arch 24 and passing out through the opposite arch 24, and the air entering under one arch 46 and passing out through the opposite arch 46. By this means the high temperature zone would be extended from above the arches 24 to below the arches 46. It has been found, however, that by introducing the air around the major portion of the periphery of the fuel column and blasting downwardly, the fuel in the high temperature zone may be heated more uniformly and the tendency to form clinker is materially diminished. Further, the introduction of steam around the major portion of the fuel column during the gas making operation provides a very uniform treatment of all the material throughout the high temperature zone and materially assists in uniformly treating the fuel throughout the column.

Figure 6:
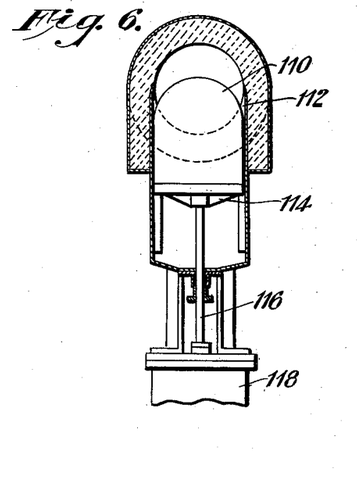
Figure 7:
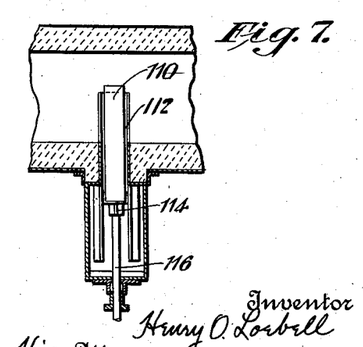
Fig. 7 is a longitudinal sectional view of the hot valves used in the connections between the regenerators and the generator.

The valves 72 and 74 in the necks 26 and 28, the valves 100 and 102 in the necks 48 and 50, and the valves 95 and 104 in the conduits 62 and 54 are subjected to high temperature gases, and therefore have to be made of refractory material. The construction of these valves is shown more particularly in Figs. 6 and 7. The valve proper consists of a block of refractory material 110, which moves through slots 112 formed in the conduits in which the valves are located. The valve 110 is connected with a head 114 which is secured to piston rod 116. The piston rod 116 is provided with a piston which is mounted on a cylinder 118, and the piston is preferably operated by hydraulic power. The valves 110 are preferably positioned in the lower portion of the conduits, whereby they will tend to open by gravity and are positively moved into closed position by means of the hydraulic piston.

The water gas made when using steam for treating the fuel column has a heat value of approximately 300 B. t. u. per cubic foot. This heat value of the gas may be materially increased by carburetting the gas with oil, provided the cost of oil will warrant its use in carburetting the gas. If the gas is to be carburetted in the apparatus shown in the drawings, one regenerator would be used for generating and for superheating steam while the other regenerator is used for carburetting the gas. To accomplish this the outlet 76 will be throttled so that a comparatively small amount of the gas is passed upward through the fuel column and practically all of the make gases are passed through the superheating elements of the regenerator. An oil will be sprayed upon the refractory filling the regenerator elements from a pipe 120 located in the top of the regenerator elements. The superheating elements develop sufficiently high temperatures so that the oil will be completely vaporized and fixed and the gas may then pass out of the regenerator to the treating apparatus. The outlets 60 and 64 for the waste gases may be used for leading the make gases out of the regenerator or separate outlets may be provided for this purpose.

During the blasting operation a large amount of ash and fuel is carried by means of blast gas into the chambers 42 and 52 of the regenerators. If this ash and fuel is carried into the refractory materials of the regenerator it tends to clog the passage, and thereby cut down the efficiency of the regenerators. To overcome this the chambers 42 and 52 are extended below passages 106 and 108 between respectively the chambers 42 and 52, and the superheating chambers 40 and 56. The blast gases passing from the chambers 42 and 52 enter the superheating elements of the regenerators after making a right angle turn which tends to throw the solid material out into the chamber. The ash and the fuel collected in the chambers 42 and 52 may be removed as desired through outlets 108, Fig. 3.

Although it is preferred to use a mixture of coal and coke in the fuel column to make a mixture of water gas and coal gas, the gas making method may be effectively carried on when coke alone is used in the fuel column. Any kind of coal and wood may be effectively used in the apparatus for making gas. Further, substantially the same method and apparatus may be used for distilling oil shale. When coke alone is used, the make gases consist only of blue water gas and the sensible heat of the gases being made is all used in preheating the fuel advancing to the high temperature zone. The method and apparatus described above are particularly effective in making blue water gas in that they provide a method with a large gas making capacity and a high thermal efficiency.

The preferred form of the invention having been thus described, what is claimed as new is:

1. In the process of making water-gas in which a gas-making zone in a fuel bed is blasted in alternate periods of time with air and steam, the improvement, which comprises introducing water into a vaporizing zone during the steam blast period, in which zone the water is substantially instantaneously converted to steam, supplying the resulting steam to the gas-making zone during said steam blasting period, and automatically decreasing at a predetermined time-controlled rate the supply of water to said vaporizing zone during said steam blasting period thereby to maintain a substantially constant excess of steam in the water-gas leaving the gas-making zone.

2. The method of making combustible gas, which comprises passing fuel in a column downwardly through a gas generator, maintaining a high temperature gas-making zone in said column by intermittently passing blast air into said zone at one level and simultaneously at opposite sides of the fuel column, passing the introduced air through the gas-making zone and removing resulting air blast products from the fuel column at a different vertical level and at an angle of substantially 90° from the points of air introduction, and between periods of air blasting passing super-heated steam through said zone counter to the direction of flow of the air therethrough during the preceding blast period, thereby to make water-gas.

3. A method of making combustible gas, comprising charging fuel into a generator, maintaining a high temperature gas-making zone in the fuel charge by blasting air therethrough, exhausting the blast gas products through a heat regenerator, admitting air to the regenerator to burn the exhaust gases therein, directing water into the heated regenerator for the direct formation of steam, passing the steam as formed and heated into the heated fuel charge to form water-gas, applying water to the bottom of the fuel charge to quench it and generate steam, and passing the steam upwardly through the charge into the high temperature zone to form water-gas.

4. A method of making combustible gas, comprising passing fuel in a column through a generator, maintaining a high temperature gas-making zone in the fuel column by periodicalling blasting air therein, exhausting the blast gases through a regenerator, admitting air to the regenerator to burn the blast gases therein, periodically passing steam through the regenerator into the fuel column to form water-gas, applying water to the bottom of the fuel column to generate steam, passing the generated steam upwardly through the fuel column into the high temperature zone to form water-gas, and gradually reducing at a predetermined rate the supply steam to the fuel column during each steam run to provide a substantially uniform volume of excess moisture in the water-gas formed throughout the water gas making period.

5. A method of making combustible gas, comprising passing fuel in a column through a generator, maintaining a high temperature gas-making zone in the mid-portion of the fuel column by intermittently blasting air therein, exhausting the blast gases through a regenerator, admitting air to the regenerator to burn blast products therein, intermittently directing water into the heated regenerator to form said steam, passing steam through the regenerator into the high temperature zone in the fuel column to form water gas, applying water to the bottom of the fuel column to generate steam therein, passing the thus generated steam upwardly to the high temperature zone of the fuel column to form water gas, and gradually reducing at a predetermined rate the amount of water admitted to the regenerator and to the bottom of the fuel column during each steam run to provide a substantially uniform volume of excess moisture in the water gas formed throughout the gas making period.

6. A method of making combustible gas, comprising passing fuel in a column through a generator, maintaining a high temperature gas-making zone in the mid-portion of the column by periodically introducing air around the major portion of the periphery of the mid-portion of the column and forcing it downwardly through the column to maintain a substantially uniform combustion therein, burning the blast products in a heat regenerator, periodically superheating steam in the heat regenerator, and introducing the steam into the lower portion of the high temperature zone around the major portion of the periphery of the fuel column to form water gas, and passing the water gas formed upwardly through the fuel column above the high temperature zone to preheat and carbonize the fuel therein.

7. A method of making combustible gas, comprising passing fuel downwardly through a generator in a column, maintaining a high temperature gas-making zone in the mid-portion of the fuel column by intermittently introducing air around the major portion of the periphery of the column, forcing the air downwardly through the zone and removing the blast gases from the column through an offtake vertically separated a substantial distance below the blast inlet, alternately burning the blast products in one of a pair of regenerators, preheating the blast air in one regenerator while absorbing the heat of combustion and the sensible heat of the blast gases in another regenerator, superheating steam in both regenerators simultaneously between blasting operations, admitting the heated steam into the fuel column at the lower portion of the high temperature zone to form water gas, and passing water gas from the high temperature zone upwardly through the fuel column thereabove to carbonize the fuel and cool the gas.

8. A method of making combustible gas, comprising passing fuel downwardly through a generator in a column, maintaining a high temperature gas-making zone in the mid-portion of the fuel column by intermittently introducing air around the major portion of the periphery of the column and forcing the air downwardly through the zone, alternately burning the blast gases in one of a pair of regenerators, preheating the blast air in one regenerator while absorbing the heat of combustion and the sensible heat of the blast gases in the other regenerator, introducing water into the heated regenerator between blasting operations to form steam therein and to superheat the steam, confining the introduction of steam from the regenerator to the lower portion of the high temperature zone, and passing steam and the water-gas formed in the high temperature zone upwardly through the cooler portion of the fuel column above the blast zone to preheat and carbonize the same.

9. A method of making combustible gas, comprising passing fuel downwardly through a generator in a column, maintaining a high temperature gas-making zone in the fuel column by intermittently introducing primary air around the major portion of the periphery of the column and forcing the air downwardly through the zone, alternately burning the blast gases in one of a pair of regenerators, preheating the primary air in one regenerator while absorbing the heat of combustion and the sensible heat of the blast gases in the other regenerator, introducing water into a heated regenerator between blasting operations to form steam and to superheat the steam, confining the introduction of steam from the regenerators to the lower portion of the high temperature zone, supplying water to the bottom of the fuel column to quench the fuel and form steam, passing the steam from the bottom of the fuel column up to the high temperature zone, and passing steam and water gas formed in the high temperature zone upwardly through the cooler portion of the fuel column above the said zone to carbonize the fuel and enrich the gas with its volatile components.

10. A method of making combustible gas, comprising passing a mixture of coke and bituminous coal in a column downwardly through a generator, maintaining a high temperature gas-making zone in the mid-portion of the fuel column by intermittently blasting air therethrough, passing steam into the high temperature zone of the fuel column between blasting operations to form water gas, burning the blast gases in a regenerator, returning the sensible heat and the heat of combustion of the blast gases to the fuel column by generating steam from water in the regenerator and superheating the steam therein before it is admitted to the fuel column and by preheating the blast air, and passing all of the water gas being made upwardly through the fuel column above the gas-making zone to remove the sensible heat of the gas, and to carbonize the coal advancing to the high temperature zone.

11. A method of making combustible gas, comprising passing fuel in a column through a generator, maintaining a high temperature gas-making zone in the fuel column by intermittently blasting primary air therethrough, exhausting gaseous blast products through a multi-sectioned heat regenerator, directing secondary air into different sections of the regenerator to burn the exhausted blast gases therein, regulating the amounts of secondary air admitted to the different sections of the regenerator so as to store a major part of the potential and sensible heat of the exhaust gases in one section of the regenerator, and between periods of air blasting, admitting water into that section of the regenerator wherein the greatest amount of heat is stored for the direct formation of steam, and passing the steam as formed through the regenerator into the heated gas-making zone to form water gas, heat remaining in said regenerator after said steam run being utilized in preheating primary air for the next blast cycle.

12. A method of making combustible gas, comprising passing fuel in a column downwardly through a shaft generator, maintaining a high temperature gas-making zone in the mid-portion of the fuel column by periodically blasting primary air therethrough, exhausting the blast products through a heat regenerator, directing secondary air into the regenerator to burn the blast gases therein, periodically admitting water into the regenerator for the direct formation of steam, passing the steam thus formed into the high temperature zone of the fuel column to generate water gas, and during the succeeding blast cycle preheating the primary and secondary air in the regenerator previously used for generating steam before passing them respectively into the fuel column and into another regenerator.

13. The method of producing mixed water gas and coal gas, which comprises passing coal downwardly in a column through a shaft generator, maintaining a high temperature gas making zone in the mid-portion of said column by air-blasting said zone in a longitudinal and diagonal direction from an annular passage surrounding said column intermediate the ends thereof, discharging the hot blast gases from the column through an annular passage surrounding said column intermediate its ends and vertically spaced from said first named passage, then shutting off the air blast and introducing steam into said column through one of said annular passages, passing additional steam upwardly through said column from the bottom thereof, and discharging the water gas formed in said zone admixed with coal gas distilled from the coal above the blast zone from the top of the column.

In testimony whereof I affix my signature.

HENRY O. LOEBELL.